United States Patent
Schwarze

(10) Patent No.: US 8,042,678 B2
(45) Date of Patent: Oct. 25, 2011

(54) DEVICE FOR STRIPPING IMPURITIES OF A BELT WEBBING FROM CONVEYOR BELT SYSTEMS

(75) Inventor: Hans-Otto Schwarze, Recklinghausen (DE)

(73) Assignee: Hosch-Foerdertechnik GmbH, Recklinghausen (DE)

( * ) Notice: Subject to any disclaimer, the term of this patent is extended or adjusted under 35 U.S.C. 154(b) by 28 days.

(21) Appl. No.: 12/677,350

(22) PCT Filed: Sep. 10, 2008

(86) PCT No.: PCT/DE2008/001500
§ 371 (c)(1),
(2), (4) Date: Mar. 10, 2010

(87) PCT Pub. No.: WO2009/033463
PCT Pub. Date: Mar. 19, 2009

(65) Prior Publication Data
US 2010/0206695 A1     Aug. 19, 2010

(30) Foreign Application Priority Data
Sep. 10, 2007   (DE) .......................... 10 2007 042 653

(51) Int. Cl.
*B65G 45/16* (2006.01)
(52) U.S. Cl. ...................................................... 198/499
(58) Field of Classification Search .................... 198/499
See application file for complete search history.

(56) References Cited

U.S. PATENT DOCUMENTS

| | | | |
|---|---|---|---|
| 3,952,863 A | * | 4/1976 | Schattauer .................... 198/499 |
| 3,994,385 A | * | 11/1976 | Reiter ............................ 198/499 |
| 4,586,600 A | * | 5/1986 | Lindbeck ....................... 198/499 |
| 5,875,881 A | * | 3/1999 | Brink ............................. 198/499 |
| 6,076,656 A | * | 6/2000 | Mat ................................ 198/499 |

FOREIGN PATENT DOCUMENTS

| | | |
|---|---|---|
| DE | 2165200 A1 | 7/1972 |
| DE | 3402407 A1 | 7/1985 |
| EP | 1529010 A1 | 5/2005 |
| GB | 2165200 A | 4/1986 |

OTHER PUBLICATIONS

International Search report mailed Dec. 29, 2008, which issued during the prosecution of corresponding International Patent Application No. PCT/DE2008/001500; 4 pages.

* cited by examiner

*Primary Examiner* — James R Bidwell
(74) *Attorney, Agent, or Firm* — Leydig, Voit & Mayer, Ltd.

(57) ABSTRACT

A device for stripping soiling from a belt webbing in a conveyor belt system includes at least one lamella support disposed on a system carrier so as to be pivotable about a first axis and at least one stripping lamella disposed on the at least one lamella support so as to be pivotable about a second axis, the at least one stripping lamella having a first arm facing the belt webbing and a second arm facing away from the belt webbing. The device further includes at least one spring device attached to the first axis and having at least one spring element configured to bias the at least one stripping lamella towards the belt webbing such that in a stripping position the first arm lies flush against the belt webbing and at least one coupling element.

13 Claims, 3 Drawing Sheets

DEVICE FOR STRIPPING IMPURITIES OF A BELT WEBBING FROM CONVEYOR BELT SYSTEMS

This application is a U.S. National Phase Application under 35 U.S.C. §371 of International Application No. PCT/DE2008/001500, filed on Sep. 10, 2008 and claims benefit to German Patent Application No. DE 10 2007 042 653.6, filed on Sep. 10, 2007. The International Application was published in German on Mar. 19, 2009 as WO 2009/033463 under PCT Article 21 (2).

The invention relates to a device for stripping soiling from a belt webbing in conveyor belt systems.

BACKGROUND

Conveyor belts on which strippers are used on an industrial scale for transporting overburden, coal, ores, excavated earth and the like, and they circulate endlessly on rollers. Normally, the material for transporting is deposited on one side of the conveyor belt, and falls off the conveyor belt at the turning stations on the other side of the conveyor belt, and the conveyor belt runs back empty on the underside of the conveyor system. However, some of the transported material sometimes becomes caked on the conveyor belt, or becomes stuck to it. It is these caked deposits that the stripper is designed to remove, and for this purpose the stripper is able to be arranged on the flat section or the turning section of the conveyor belt.

However, conveyor belts also have uneven areas and irregularities, for example, the sites where the endless conveyor belt is joined to itself. Strippers must not damage these sites on the conveyor belt under any circumstances. Therefore, the strippers must respond differently to dirt that has stuck to the conveyor belt than they do to irregularities in the conveyor belt itself This distinction usually poses considerable difficulties for purely mechanical stripper systems, which has in turn resulted in the creation of very many different designs therefor.

Patent No. EP 1 529 010 B1 shows a device for stripping soiling from a belt webbing in a conveyor system that has a lamella support disposed on a system carrier so as to be pivotable about a first axis, and is arranged in the turning area of the conveyor belt. A stripping lamella is provided on the lamella support so as to be pivotable about a second axis, the stripping lamella having a first arm and a second arm, which extend diametrically from the second axis. The first arm extends in the direction of the belt webbing and has a stripping edge that lies flush against a belt webbing so as to scrape the surface thereof The second arm of the stripping lamella is provided on the side of the stripping lamella facing away from the belt webbing. The first axis provides a pivot joint for the lamella support relative to the system carrier, wherein a first spring device having a spring element that biases the stripping lamella towards the webbing belt is attached to the pivot joint, so that in a stripping position the stripping lamella lies with the first arm flush against the webbing belt and scrapes soiling from webbing belt. The second axis provides a second pivot point for the stripping lamella relative to the lamella support, wherein a second spring device having a second spring element is attached to the second pivot joint. The spring force of the second spring device is loaded in the opposite direction to the direction of the spring force of the first spring device. The second spring element serves to keep the stripping lamella in the desired stripping position with a scraping attitude relative to the belt webbing. Then, if the stripping lamella encounters a larger obstruction on the belt webbing, the stripping lamella breaks away from the belt webbing due to the two pivot joints that are biased by the two spring elements.

German Patent No. DE 34 02 407 A1 shows another device for stripping soiling from a belt webbing of conveyor systems, attached to the lower, returning section of the belt webbing. This device has a guide that is arranged on a crosspiece so as to be pivotable about a first axis, and a stripping element that is arranged pivotably about a second axis, which stripping element has a first arm facing the belt and a second arm facing away from the belt, and also a spring that is attached to the first axis, which biases a stripping element towards the belt so that the stripping element lies flush against the belt in a stripping position. A guide is also arranged on the second arm of the stripping element and couples the stripping element to the spring.

The drawback associated with these types of stripper is that their construction is complex and complicated due to the large number of individual parts they contain. In order to ensure that the stripping lamella lies perfectly flush against the belt webbing to remove small particles of dirt, but still ensure that the stripping lamella pivots back to avoid larger obstructions, the spring forces of the two spring elements arranged on the two pivot joints must be balanced against each other perfectly, in order to ensure that the belt webbing may be scraped adequately.

Another problem arises after the spring-loaded strippers have been pivoted back, when they are to be returned to their starting positions. On the one hand, this operation must not take too long, on the other hand, the stripping lamella must not strike the belt webbing so fast so that it chops and damages it. In practical terms, this means that only large forces may be used to pivot the strippers back, but the necessary counteracting spring force must not transfer strong impacts to the belt webbing when the strippers are pivoted back into contact with it. However, the corresponding damping devices must slow the return pivot as little as possible. These requirements are fundamentally contradictory.

SUMMARY OF THE INVENTION

An aspect of the present invention is to suggest a device for stripping soiling from belt webbing, with which dirt may be scraped off surely and reliably, and which is pivoted away from the belt webbing to avoid large obstructions and reliably returned to the stripping position, and at the same time having a simpler construction.

In an embodiment of the invention, a device for stripping soiling of a belt webbing in conveyor belt systems comprises
   at least one lamella support arranged on a system carrier so as to be pivotable about a first axis
   at least one stripping lamella arranged on the lamella support so as to be pivotable about a second axis, and having a first arm facing the belt webbing and a second arm facing away from the belt webbing, and
   at least one spring device attached to the first axis and having at least one spring element, which spring element biases the stripping lamella towards the belt webbing, so that when in a stripping position the stripping lamella with the first arm lies flush against the belt webbing,
   at least one coupling element is arranged on an arm of the first arm and on the second arm of the stripping lamella, and couples the stripping lamella with the spring device, wherein
   the pivot point of the coupling element on the spring device is effected via a projection that is pivotable about an axis that is also the axis of the lamella support, the coupling element is arranged on the stripping lamella so as to be pivotable about an axis.

The spring device is connected to the system carrier, and the lamella support, and the coupling element at the pivot joint, and the lamella support is pressed against the belt webbing via the spring device.

In order to ensure that the soiling is scraped off of the belt webbing of the conveyor belt system cleanly and reliably, the stripping lamella must lie appropriately flush against the webbing belt so that it is able to scrape the belt, and the pressing force of the stripping lamella must not be too strong, to avoid damaging the belt webbing, nor too weak, so that it is able to remove the soiling. The first axis serves as a pivot point between the system carrier and the lamella support, which pivot point is biased by the spring element of the spring device so that it forces the stripping lamella to lie flush on the belt webbing and holds it in place there.

According to the invention, provision is made for at least one coupling element to be arranged on the second arm of the stripping lamella to couple the stripping lamella to the spring device arranged on the first axis. Since the stripping lamella is pivotable about a second pivot joint, which is created by the second axis, the coupling element transfers a force from the spring device to the stripping lamella, so that the stripping lamella is also biased by the spring element that is arranged on the first axis. This ensures that the stripping lamella lies flush against the belt webbing and scrapes small particles of dirt from belt webbing. It further ensures that the stripping lamella is withdrawn from the webbing belt when large obstructions are met. When the stripping lamella is withdrawn from the webbing belt, the obstruction first strikes the first arm of the stripping lamella, causing it to pivot against the spring force of the spring element, which force is acting on the stripping lamella via the coupling element. At the same time, the lamella support is pivoted away from the webbing belt against the same spring force of the spring device.

The pivoting motion of the lamella support about the first pivot joint is superimposed on the pivoting motion of the stripping lamella about the second pivot joint. The provision of a means for coupling these two pivoting motions by coupling the stripping lamella to the spring element via the coupling element results in a uniform pivoting motion that retracts the stripping lamella reliably from the belt webbing, preventing it from being damaged by the obstructions. It further ensures that the stripping lamella is pivoted back against the belt webbing quickly and safely without damaging the belt webbing, and that soiling is removed.

The coupling element provides the further advantage that the construction of the stripping device is simplified so that a further spring device on the second pivot joint, about which the stripping lamella is pivotable relative to the lamella support, is no longer necessary.

The transfer of spring force from the spring element of the spring device to the stripping lamella is determined by the alignment of the coupling element relative to the spring device and the stripping lamella, that is to say the angle at which the coupling element is arranged on the stripping lamella and the spring device. To ensure that the spring force is transferred to the stripping lamella via the coupling element for the entire pivoting traverse of the lamella support and the stripping lamella, the coupling element is advantageously arranged on the stripping lamella so as to be pivotable about an axis in such manner that when the stripping lamella and the lamella support are pivoted, this pivoting motion ensures that the coupling element is aligned between the spring device and the stripping lamella as desired for transferring the force.

It is expediently provided that the coupling element is also arranged pivotably on the spring device.

In a preferred embodiment, the coupling element is provided in the form of a coupling rod, thereby simplifying the construction of the device further.

Of course, the coupling element may also have the form of a push rod or a pull rod to reinforce or soften the spring force of the spring element, depending on requirements. For example, the coupling element may be in the form of a tension spring or hydraulic spring. It may also be provided that the coupling element is a cord.

In a further preferred embodiment, the spring device is furnished with a housing in which the one spring element of the spring device is arranged. This serves to shield the spring element from external influences, thus advantageously protecting the spring element from dirt and the associated functional vulnerability.

The housing advantageously comprises a first housing section and a second housing section, the first housing section being attached to the system carrier and the second housing section being attached to the lamella support. The first housing section is expediently permanently attached to the system carrier, so that the first housing section is not pivotable about the first axis. On the other hand, the second housing section is attached to the lamella support in such manner that the second housing section is pivotable about the first axis. Accordingly, the first housing section is arranged on the axis so as to be rotatable relative to the second housing section.

The two housing sections are advantageously biased against one another by the spring element of the spring device. The spring element of the spring device is advantageously provided in the form of a helical spring, the first end of which helical spring is connected to the first housing section, and the second end of which is connected to the second housing section. In this way, the first housing section is biased with respect to the second housing section, thereby biasing the lamella support with respect to the system carrier. Of course, the spring element may also be provided in any other form of spring, such as a rubber torsion spring or similar, for example.

In another advantageous embodiment, the coupling element is arranged on the second arm of the stripping lamella, that is to say on the side of the stripping lamella facing away from the belt webbing. In this configuration, the two arms are separated by the second axis, or by the pivot joint that is defined by the second axis. As a result, when the coupling element is arranged on the second arm, facing away from the belt webbing, the coupling element is arranged on the side of the stripping lamella facing away from the belt webbing with respect to the second axis.

When the coupling element is arranged on the stripping lamella and the spring device, it is important to ensure that the bias applied to the stripping lamella about the second pivot joint is opposite or counter to the bias applied by the spring element to the lamella support with respect to the system carrier about the second pivot joint. In order to ensure opposite biasing for the first pivot joint and the second pivot joint via a spring element, the straight line that connects the first and second axes, or the two pivot joints, with each other must be considered. For example, if the coupling element arranged on the spring device to the left of the connecting straight line, for example on a protrusion on the second housing section, which is rotatable with respect to the first axis, the spring element will create clockwise bias for the first pivot joint. In order to create bias in the opposite direction for the second pivot joint, the coupling element must be arranged on the second arm of the stripping lamella, that is to say on the right side of the connecting straight line. The coupling element and the connecting straight line must cross each other.

In a further advantageous embodiment, the spring device includes a second spring element. Provision of a second spring element, which is also attached to the first pivot joint, that is to say the first axis between the system carrier and the lamella support, ensures that the first spring element biases the stripping lamella about the second pivot joint via the coupling element, and the second spring element biases the lamella support about the first pivot joint. The spring actions of both these spring elements are in the same direction.

A limit stop is advantageously provided on the second arm of the stripping lamella, this limit stop lying flush with the lamella support when the dirt scraping device is in the scraping position. The limit stop is held on the lamella support via the coupling element. If the limit stop is designed to lie flush against the lamella support, the coupling of the spring device with the second arm of the stripping lamella enables a force to be exerted on the lamella support via the limit stop, so that the lamella support remains securely pressed towards the belt webbing, which in turn ensures that the stripping lamella lies securely and reliably flush with the belt webbing for removing dirt.

The limit stop also ensures that when pivoting back after withdrawing to avoid large obstructions, the stripping lamella comes to rest against the lamella support at an early stage, that is to say before the stripping lamella comes into contact with the belt webbing again, because of the limit stop, so that the stripping lamella is aligned in such a way that it does not damage the belt webbing when it comes into contact with it.

The limit stop is advantageously constructed from an elastic material, so that the impact of the stripping lamella against the lamella support is softened by the limit stop when the stripping lamella is pivoted back. In this context, the limit stop is made for example from a rubber or a plastic for shock absorption.

BRIEF DESCRIPTION OF THE DRAWINGS

In the following, the invention will be described on the basis of two preferred embodiments and with reference to the accompanying drawing.

DETAILED DESCRIPTION

Figure 1:
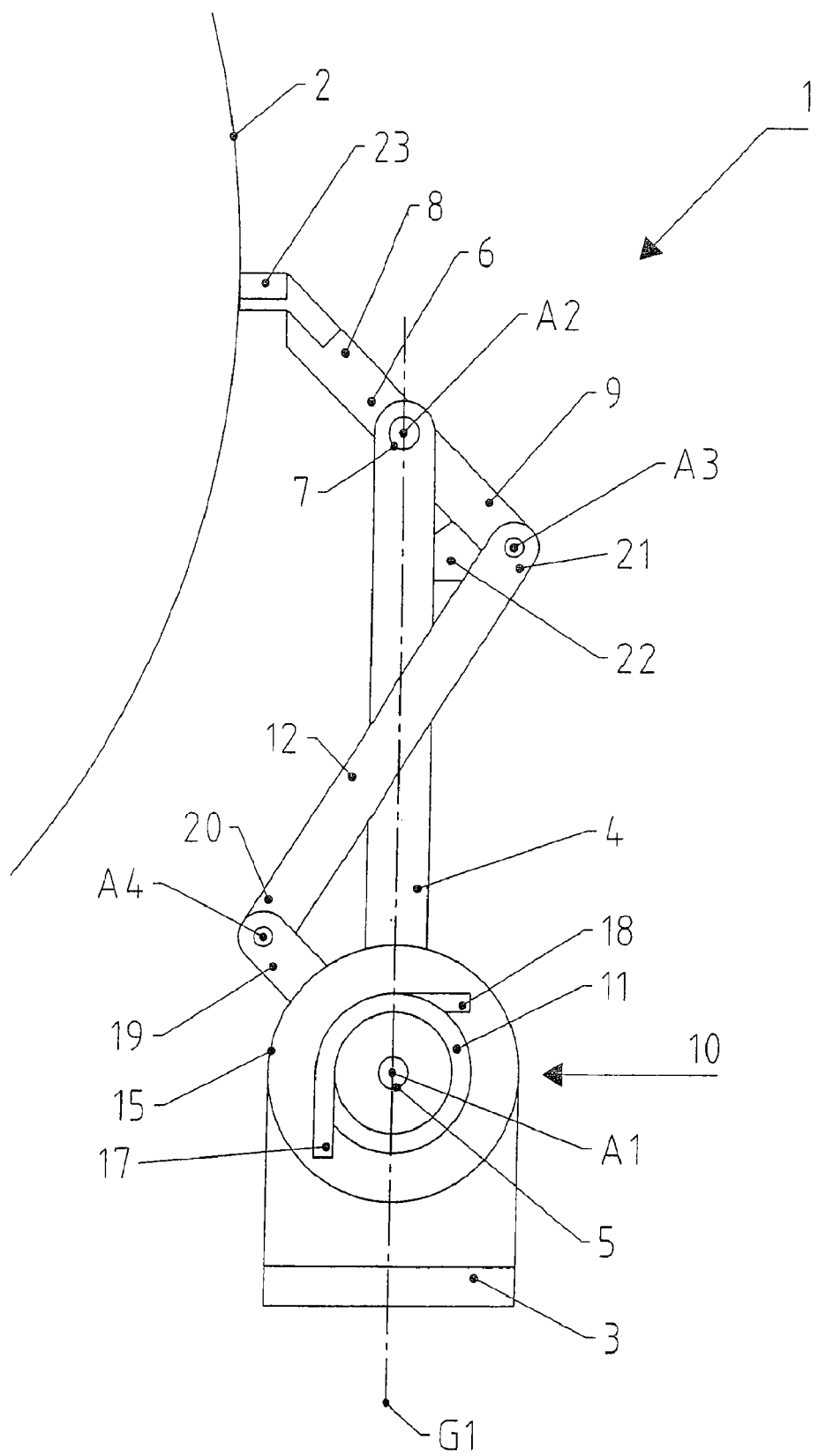
FIG. 1 is a side view of the first preferred embodiment of a device according to the invention for stripping soiling from belt webbings.
Figure 2:
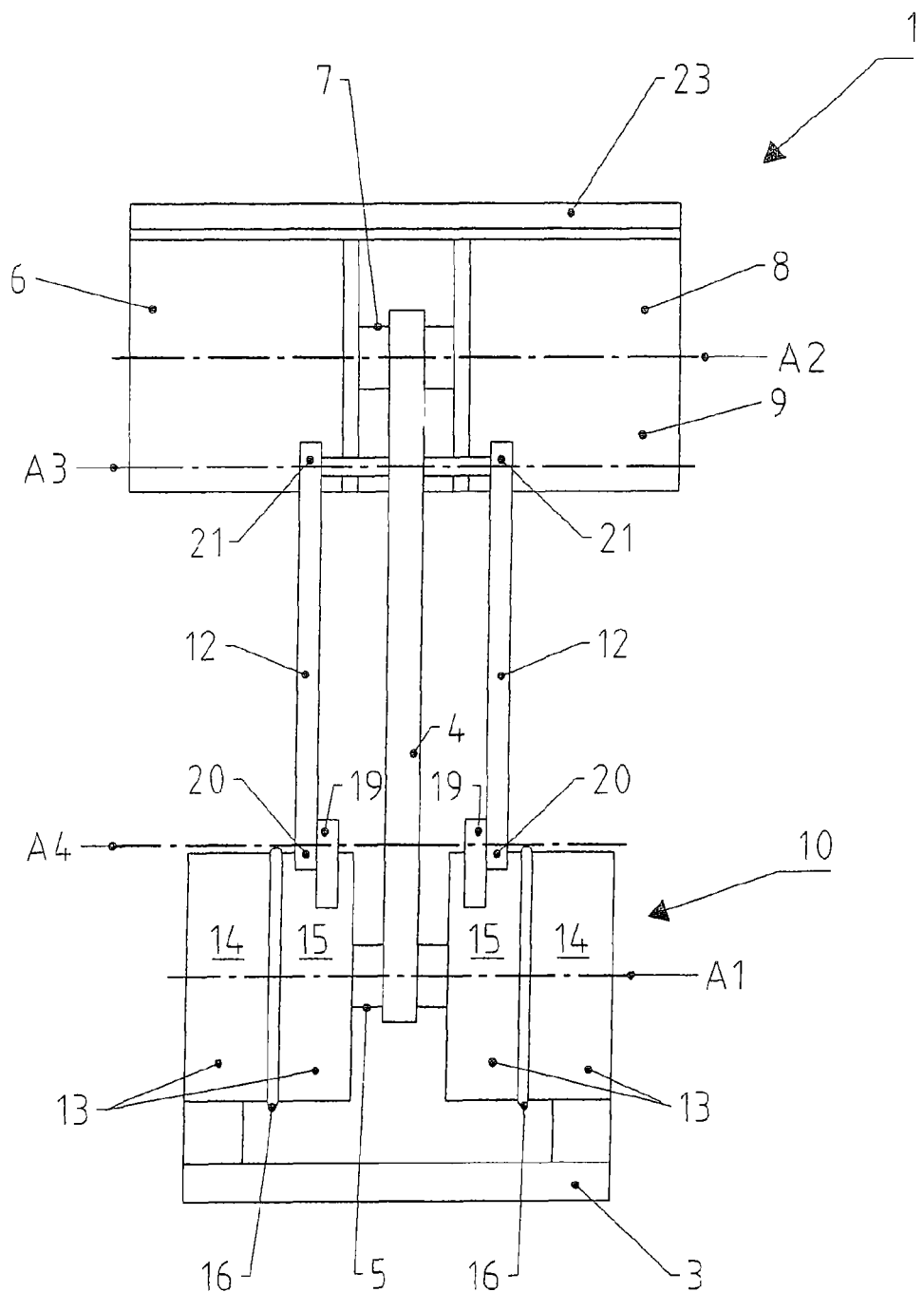
FIG. 2 is a front view of a first embodiment from FIG. 1.

FIGS. 1 and 2 show a first preferred embodiment of a device 1 for stripping impurities of a belt webbing 2 from conveyor belts, in which a system carrier 3 is provided, on which a lamella support 4 with a first end is arranged so as to be pivotable about a first axis A1. The pivotable arrangement of lamella support 4 on system carrier 3 creates a first horizontal pivot joint 5. A stripping lamella 6 is arranged pivotably about a second axis A2 on a second end of lamella support 4, facing away from the first end, thereby creating a second horizontal pivot joint 7.

Stripping lamella 6 has a first arm 8 and a second arm 9, both arms 8 and 9 extending away from second pivot joint 7 and in opposite directions relative to second pivot joint 7. First arm 8 extends from second axis A2 towards belt webbing 2, against which the first arm 8 of stripping lamella 6 lies flush. Second arm 9 extends away from belt webbing 2.

A spring device 10 with a spring element 11 is attached to first pivot joint 5 on first axis A1, which spring element biases stripping lamella 6 against belt webbing 2. Spring device 10 is coupled to second arm 9 of stripping lamella 6 via two coupling elements 12.

According to the front view in FIG. 2, the device shown for stripping dirt is constructed symmetrically about lamella support 4, that is to say in particular that the spring device comprises two aligned spring elements 11, each of the two spring elements 11 being coupled to second arm 9 of stripping lamella 6 via a separate coupling element 12. The two coupling elements 12 are arranged on each side of lamella support 4, and the two coupling elements 12 are arranged parallel to one another. Each of the two coupling elements 12 is connected to second arm 9 of stripping lamella 6 so as to be pivotable about a third axis A3. In the following explanation, the design of the spring device on only one side of lamella support 4 will be described in detail, because the construction of both sides is identical.

Spring device 10 includes a housing 13 with a circular cross-section. Housing 13 includes a first housing section 14 and a second housing section 15, first housing section 14 being arranged on system carrier 3, and second housing section 15 being arranged on lamella support 4. First housing section 14 is arranged on system carrier 3 in such manner that first housing section 14 is not rotatable relative to first axis A1. On the other hand, second housing section 15 is attached to lamella support 4 in such manner that second housing section 15 is able to pivot about first axis A1, as does the lamella support. Accordingly, first housing section 14 and second housing section 15 are arranged rotatably with respect to one another, and an O-ring 16 made from a synthetic material, for example rubber, is arranged between the two housing sections.

A spring element 11 is provided in housing 13 for spring device 10, spring element 11 having the form of a helical spring. A first end 17 of the helical spring is connected to first housing section 14, and a second end 18 is connected to second housing section 15, such that second housing section 15 is biased with respect to first housing section 14 by the spring effect of the helical spring. This in turn also exerts a corresponding force on lamella support 4. The spring force of spring element 11 is applied in counterclockwise direction, so that lamella support 4 is also biased in clockwise direction, and stripping lamella 6, which is arranged on lamella support 4, is also subjected to a force in the direction of belt webbing 2.

A protrusion 19 is provided on second housing section 15, and extends in the direction of belt webbing 2. In the stripping position, in which small dirt particles are removed from the belt webbing, the protrusion is provided on the left side relative to a straight line G1 connecting first pivot joint 5 with second pivot joint 7, that is to say on the side of connecting straight line G1 that faces towards belt webbing 2.

Coupling element 12 is arranged on protrusion 19 so as to be pivotable about a fourth axis A4. Coupling element 12 has the form of a coupling rod. Accordingly, a first end 20 of coupling element 12 is arranged on the side facing towards belt webbing 2 with respect to connecting straight line G1.

Coupling rod 12 is arranged with a second end 21 on second arm 9 of stripping lamella so as to be pivotable about third axis A3. Second arm 9 of stripping lamella 6 is arranged on the right side, that is to say on the side facing away from belt webbing 2, with respect to connecting straight line G1. Consequently, coupling element 12 is arranged on stripping lamella 6 and spring device 10 with first end 20 and second end 21 on opposite sides of connecting straight line G1. In this manner, it is possible to apply a clockwise force to first pivot joint 5 and an anticlockwise force to second pivot joint 7 via spring element 11 of spring device 10 that is arranged on first pivot joint 5.

A limit stop 22 is provided on second arm 9 of stripping lamella 6, and lies flush with lamella support 4 in the stripping position. A stripping edge 23 with an essentially rectangular cross-section having one long and one short side is arranged on first arm 8 of stripping lamella 6. Stripping edge 23 is affixed, for example glued, by one long side and one short side, to first arm 8. The other short side of stripping edge 23 lies flush with belt webbing 2, so that the edge between the long and short sides of stripping edge 23 scrapes impurities off of belt webbing 2.

Figure 3:
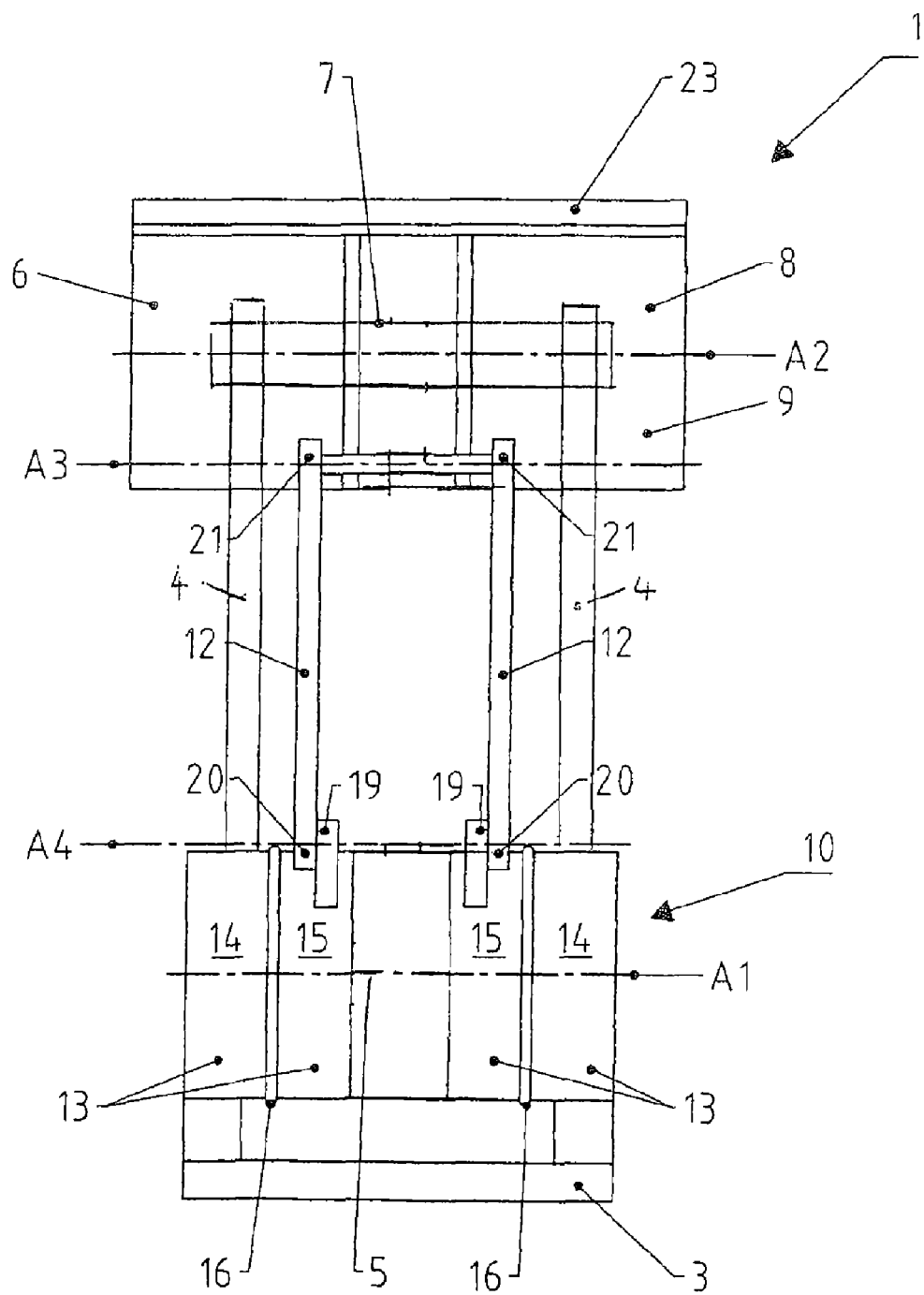
FIG. 3 is a front view of a second embodiment from FIG. 1.

FIG. 3 shows a front view of another symmetrical device for stripping impurities, having not one centrally arranged lamella support 4, but two lamella supports 4 arranged mirror-symmetrically. All other elements are similar to those of FIG. 2.

The device described above for stripping impurities from belt webbings of a conveyor belt system works as follows:

When device 1 is operating normally, that is to say in the position for stripping small dirt particles, the device is arranged on belt webbing 2 in such manner that stripping edge 23 of stripping lamella 6 is in contact with belt webbing 2 in the "three o'clock position". In this way, small dirt particles are scraped off of belt webbing 2 by stripping edge 23. Lamella support 4, and thus also stripping lamella 6, is pressed and held against belt webbing 2 by the counterclockwise spring force of spring element 11, such that stripping lamella 6 is not forced away from belt webbing 2 by the impurities, which are instead removed from the belt webbing 2. In order to assure that stripping lamella 6 is aligned optimally with belt webbing 2, the lamella is coupled to the helical spring of spring device 10 by means of coupling element 12 via second housing section 12, such that second pivot joint 7, and thus also stripping lamella 6, is biased clockwise by spring element 11. This ensures that stripping lamella 6 is biased towards the impurities on belt webbing 2. Stripping lamella 6 is kept in this position by limit stop 22, which lies flush with lamella support 4 when the device is in the stripping position.

If obstructions or debris, such as belt damage, are encountered on the belt webbing, stripping lamella 6 and lamella support 4 are pivoted against the spring force of spring device 10. First, an obstruction strikes stripping edge 23 and pivots stripping lamella 6 counter-clockwise about second axis A2 of second pivot joint 7, limit stop 22 being pivoted away by lamella support 4. Second arm 9 of stripping lamella 6 pivots against the spring force of spring element 11, because second arm 9 is coupled therewith via coupling element 12. Lamella support 4 is pivoted clockwise about first axis A1 in first pivot joint 5. The combination pivoting motion about first axis A1 and second axis A2 causes stripping lamella 6 to be pivoted away from belt webbing 2, thus ensuring that stripping lamella 6 avoids the obstruction and is not damaged by it.

Stripping lamella 6 and lamella support 4 are pivoted back towards belt webbing 2 by the spring force of spring element 11. In this context stripping lamella 6 is first pivoted clockwise due to spring element 11 until limit stop 22 is lying flush with lamella support 4. Then, lamella support 4 is pivoted about axis A1 of first horizontal pivot joint 5 relative to system carrier 3, so that stripping edge 23 is in contact with belt webbing 2 and is able to scrape again, and the fact that limit stop 22 is flush with lamella support 4 causes stripping lamella 6 to be oriented so that stripping edge 23 is brought into contact with the flat surface of belt webbing 2, and the webbing belt 2 is not struck by an edge of the stripping edge, which might cause damage. The pivoting operation of device 1 is carried out in a few fractions of a second.

In the preceding text, the invention has been explained in detail with reference to two embodiments in which coupling element 12 is arranged on second arm 9 of stripping lamella 6. Of course, coupling element 12 may equally well be arranged on the first arm 8 of stripping lamella 6. In this case, it should be ensured that coupling element 12 is coupled correspondingly with spring device 10, so that an opposite bias is created for first and second pivot joints 5 and 7.

LEGEND

1 Stripping device
2 Belt webbing
3 System carrier
4 Lamella support
5 First horizontal pivot joint
6 Stripping lamella
7 Second horizontal pivot joint
8 First arm
9 Second arm
10 Spring device
11 Spring element
12 Coupling element
13 Housing
14 First housing section
15 Second housing section
16 O-ring
17 First end of spring element 11
18 Second end of spring element 11
19 Protrusion
20 First end of coupling element 12
21 Second end of coupling element 12
22 Limit stop
23 Stripping edge
A1 First axis
A2 Second axis
A3 Third axis
A4 Fourth axis
G1 Connecting straight line

The invention claimed is:

1. A device for stripping soiling from a belt webbing in a conveyor belt system comprising:
   at least one lamella support disposed on a system carrier so as to be pivotable about a first axis;
   at least one stripping lamella disposed on the at least one lamella support so as to be pivotable about a second axis, the at least one stripping lamella having a first arm facing the belt webbing and a second arm facing away from the belt webbing;
   at least one spring device attached to the first axis and having at least one spring element configured to bias the at least one stripping lamella towards the belt webbing such that in a stripping position the first arm lies flush against the belt webbing;
   at least one coupling element disposed on the second arm so as to couple the at least one stripping lamella with the at least one spring device and pivotable about a third axis, wherein the at least one spring device is connected to the system carrier, the at least one lamella support, and the at least one coupling element at a first horizontal pivot point, and wherein the at least one spring device is configured to press the at least one lamella support against the belt webbing; and a projection pivotable about the first axis and configured to effect a pivoting of the at least one coupling element about a fourth axis.

2. The device as recited in claim 1, wherein the at least one coupling element includes two coupling elements parallel to each other.

3. The device as recited in claim 2, wherein the two coupling elements are disposed on opposite sides of the at least one lamella support.

4. The device as recited in claim 1, wherein the at least one lamella support includes two lamella supports parallel to each other.

5. The device as recited in claim 1, wherein the at least one spring element includes a helical spring of a torsion spring.

6. The device as recited in claim 1, wherein the at least one spring device includes a housing, and wherein the at least one spring element is disposed in the housing.

7. The device as recited in claim 6, wherein the housing includes a first housing section and a second housing section, and wherein the first housing section is connected to the system carrier and the second housing section is connected to the at least one lamella support.

8. The device as recited in claim 7, wherein the at least one coupling element is disposed on the second housing section.

9. The device as recited in claim 7, wherein a first end of the helical spring is disposed on the first housing section and a second end of the helical spring is disposed on the second housing section.

10. The device as recited in claim 1, further comprising a stripping edge disposed on the first arm.

11. The device as recited in claim 1, further comprising a limit stop disposed on the second arm and flush with the at least one lamella support in the stripping position.

12. The device as recited in claim 1, wherein the second axis is a connection point of the first and the second arms.

13. The device as recited in claim 1, wherein the at least one stripping lamella is disposed on a carrier element, and wherein the carrier element is disposed on the at least one lamella support so as to be pivotable on the at least one lamella support.

\* \* \* \* \*